United States Patent [19]

Kutzner

[11] Patent Number: 4,759,582
[45] Date of Patent: Jul. 26, 1988

[54] PORTABLE LODGING

[76] Inventor: Jürgen Kutzner, Alsenstrasse 26b, D-1000 Berlin 39, Fed. Rep. of Germany

[21] Appl. No.: 821,739
[22] PCT Filed: Apr. 11, 1985
[86] PCT No.: PCT/DE85/00116
§ 371 Date: Dec. 31, 1985
§ 102(e) Date: Dec. 31, 1985
[87] PCT Pub. No.: WO85/04625
PCT Pub. Date: Oct. 24, 1985

[30] Foreign Application Priority Data

Apr. 12, 1984 [DE] Fed. Rep. of Germany ....... 3414013

[51] Int. Cl.⁴ .............................................. B60P 3/38
[52] U.S. Cl. ................... 296/170; 296/171; 296/173; 296/175; 296/26; 5/118
[58] Field of Search ............... 296/26, 170, 171, 173, 296/175; 135/88; 5/119, 118

[56] References Cited

U.S. PATENT DOCUMENTS 1,436,984 11/1922 Follett ..................................... 296/26
2,231,822 8/1937 Austin ..................................... 155/6
3,484,131 12/1969 Shea ....................................... 296/23
4,652,041 3/1987 Barber et al. ........................ 296/171

FOREIGN PATENT DOCUMENTS 1908812 7/1957 Austria.
2719293 11/1978 Fed. Rep. of Germany.
128043 7/1918 United Kingdom ..................... 5/119
1043975 9/1966 United Kingdom.

Primary Examiner—Dennis H. Pedder
Attorney, Agent, or Firm—Spencer & Frank

[57] ABSTRACT

Mobile lodging, including a vehicular body for a trailer and having a plurality of adjacent sleeping cabins with dimensions that can be reduced for transport. Each sleeping cabin includes a fixed portion and a sleeping element extending in a longitudinal direction and containing at least one bed. The sleeping element is slidable in a longitudinal direction in the fixed portion between an open configuration in which the fixed portion contains an open aisle region located longitudinally behind the bed and a closed configuration in which the sleeping element totally occupies the aisle region. The aisle region of each sleeping cabin is directly laterally accessible from the sleeping element of the immediately laterally adjacent sleeping cabin.

7 Claims, 2 Drawing Sheets

PORTABLE LODGING

BACKGROUND OF THE INVENTION

The invention relates to a mobile lodging including a vehicle body for a trailer and having a plurality of adjacent sleeping cabins with dimensions that can be reduced for transport.

It is already known for a tour bus having a center aisle and rows of seats arranged at both sides of the aisle to use the seat cushions to arrange sleeping areas for the passengers in two superposed planes. The passengers lie next to one another in pairs, separated by the center aisle and curtains drawn therein (U.S. Pat. No. 2,231,822). However, this manner of partitioning sleeping cabins offers a place to sleep for only a small number of passengers.

It is also known to use the side sections of a box-type vehicle to erect sleeping berths adjacent the longitudinal sides of the box-type vehicle, with the sleeping berths extending outside the box-type vehicle transversely to its longitudinal axis. The box-type vehicle itself here serves as the floor from which the sleeping berths are reached and otherwise accommodates cabinets (Austrian Pat. No. 190,812). However, on trips where every night is spent at a different location, it is time consuming and cumbersome to erect the cabin structure each night outside the box-type vehicle and adjacent thereto, to accommodate the beds therein and the next morning to store the beds again within the box-type vehicle and to dismantle the cabin structures.

SUMMARY OF THE INVENTION

It is an object of the invention to provide lodging of the above-stated type which, although of low-cost design, has high inherent strength and is uncomplicated in its structure.

The above and other objects are accomplished according to the invention in the context of a mobile lodging as first described above wherein each sleeping cabin includes a fixed portion, and a sleeping element extending in a longitudinal direction and containing at least one bed, the sleeping element being slidable in the longitudinal direction in the fixed portion in an open configuration in which the fixed element contains an open aisle region located longitudinally behind the at least one bed and a closed configuration in which the sleeping element totally occupies the aisle region, each sleeping cabin having another sleeping cabin immediately laterally adjacent thereto, the aisle region of each sleeping cabin being directly laterally accessible from the sleeping element of the immediately laterally adjacent sleeping cabin.

The invention is based on the realization that each entire sleeping element is designed to be pulled out until the innermost end of the sleeping element lies above the longitudinal axis of the lodging and the outer end thus projects relatively far to the side. However, it is not necessary that within the sleeping cabin an aisle region be adjacent the entire length of the bed. It is sufficient if access to the bed includes an aisle region that lies within the reduced-size outline of the vehicle body formed when the sleeping cabins are in the closed configuration. However preferably, the part of the sleeping element that can be pulled out beyond this outline is limited to the width of the bed.

The stated solution permits better space utilization in that a bed and cabinet element is constructed in the manner of a vertical drawer and the aisle region which can be used as a dressing area can not be pulled out. This results in a savings of material due in part to the elimination of stiffening elements since the pull-out sleeping elements as a whole are kept smaller and therefore have increased inherent stability. The sleeping elements are preferably pulled out only to one third of their length which permits a simple design for the vehicle frame and the use of uncomplicated supporting elements.

A preferred embodiment is distinguished by the fact that, in a mobile lodging of the above-mentioned type, the greatest possible amount of space can be saved in the transporting position if the sleeping element taking up the most room in the longitudinal direction, i.e., the bed, of the one cabin can be pushed into the corresponding free space forming the aisle of an adjacent cabin, which likewise is provided with an aisle region alongside its beds.

In preferred modifications of the invention, a cabinet unit is provided at the end of the aisle region which, in the pushed-together (closed) state, is disposed at the end of the bed of the sleeping element of the adjacent cabin so that no significant broadening occurs in the transporting position even with the additional furniture in the form of the cabinet.

Preferably, the adjacent sleeping cabins are most favorably of similar configuration and are simply rotated 180° relative to another and installed adjacent one another so that identical components can be employed.

In the preferred embodiment, access to the cabins occurs from the outside through a door disposed in the fixed (aisle) portion of the sleeping cabin. The adjacently disposed sleeping element is pulled out only to one third its length and therefore requires less complicated supporting devices. The free space thus created at the end of one sleeping element for an adjacently disposed sleeping element serves to provide access to and egress from the beds which are preferably designed as sleeping berths (single or double bunks). The double bunk beds may be kept relatively narrow because the lateral delimitations provided at the head and foot ends of the beds of the cabinet element and the lateral partition, respectively for the outwardly projecting portion of the sleeping element prevent the occupants from inadvertently falling out of the beds.

With these relatively small and thus stable elements, the strength of the entire vehicle structure as a whole is likewise increased. A further advantage resides in the good guide possibilities for the drawer-like element.

Preferably the cabins are interconnected in a mobile embodiment, particularly in the form of an automobile trailer or in the form of containers that can be placed onto such vehicles. In larger units, the beds are arranged transversely while for small camper trailers an arrangement is favorable which is composed of only two cabin elements in which the beds are arranged in the direction of travel.

For trailers having a fixed tongue, at least one toilet or bathroom can be disposed above this tongue, with the volume of this room being enlargeable in that wall and/or ceiling portions can be pivoted out about a fulcrum disposed in the vicinity of the hitch ring. In larger units, bathrooms are provided which can be pushed into one another according to the same principle as the sleeping areas, with then the pushing together occurring appropriately in such a manner that fixed elements of the one cabin are pushed into free spaces in the other cabin - i.e. a wash basin is pushed over the toilet seat of the oppositely disposed cabin, etc.

BRIEF DESCRIPTION OF THE DRAWINGS

Advantageous features of the invention are defined in the claims and will be described in greater detail below with reference to the embodiments of the invention listed below, wherein:

DESCRIPTION OF THE PREFERRED EMBODIMENT

Figure 1:
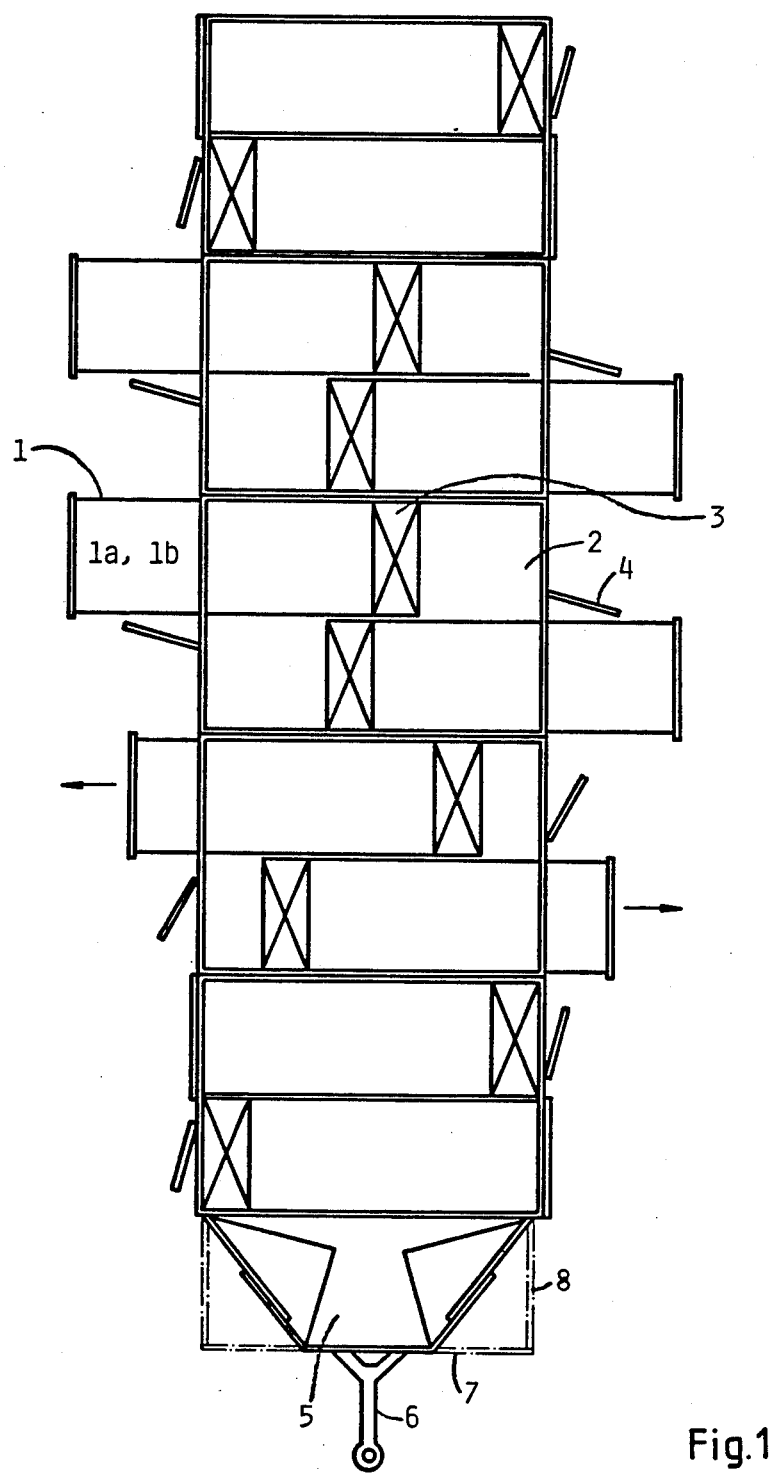
FIG. 1 is a schematic showing a plan view of an embodiment of the invention.

The plan view of FIG. 1 shows a vehicle body in the form of a sleeping trailer designed according to the invention for tour buses and other tractor-trailers. Sleeping cabins are arranged transversely to the longitudinal axis of the vehicle, each composed of an extendable part (sleeping element) 1 including two superposed beds 1a and 1b and a cabinet 3 at the foot ends of the beds. From fixed cabin portions, dressing areas (aisles) 2 are created when the sleeping elements, accessible from the outside through doors 4, are pulled apart in a longitudinal or "sleeping" direction relative to the fixed cabin portions. The vehicle body is shown in the pulled-out (open) state. In the extended position, the sleeping elements are supported by foldable supports, which, however, are not shown in detail. For pushing the unit together, telescoping rails or rollers may be employed which are likewise not shown. The extendable part 1, which accommodates the bed, is designed as a "drawer-like pull-out [unit]" including a roof so that its structure, which as a whole is block shaped, provides high inherent stability.

When the units are pushed together, the bed area of one sleeping element is pushed in the sleeping direction back into the fixed portion, that is, the oppositely disposed dressing area of the adjacent sleeping cabin. At the same time, the supports are folded up. This reduces the width of the vehicle body to dimensions permissible for automobile trailers.

A bathroom cabin 5 including a wash basin (not shown) is disposed on the tongue 6 of the bus or tractor trailer. The side members 7 and 8 of the bathroom cabin are arranged to be pivotal so as to enlarge the available space.

The vehicle body according to the invention enables the passengers to have available as much space as possible during the night and, during travel, the width of the vehicle does not exceed the normal width of a bus or tractor trailer. The vehicle body is easy to operate and is simple in design. Noise insulation between adjacent cabins is high. Each cabin has its own entrance so that substantial independence of the inhabitants is assured.

It can be seen in FIG. 1 that accessibility from the outside provides an internal partition between cabins in the form of cabinets which are disposed at the ends of the beds and are fixed to them. In the pushed-together state, the total width of the vehicle trailer corresponds to the total length of the bunk beds including the depth of the cabinet. The basic arrangement forming one cabin is identical in structure for all cabins and adjacently disposed sleeping elements are simply pivoted 180° relative to each other. When pushed together, the beds of adjacent sleeping elements slide past one another. Corresponding guide and bearing elements (telescoping rails, tread rollers or the like) assure easy operation and reliable guidance. Remaining slits toward the adjacent cabin or toward the outside are closed by corresponding sealing strips.

Figure 2:
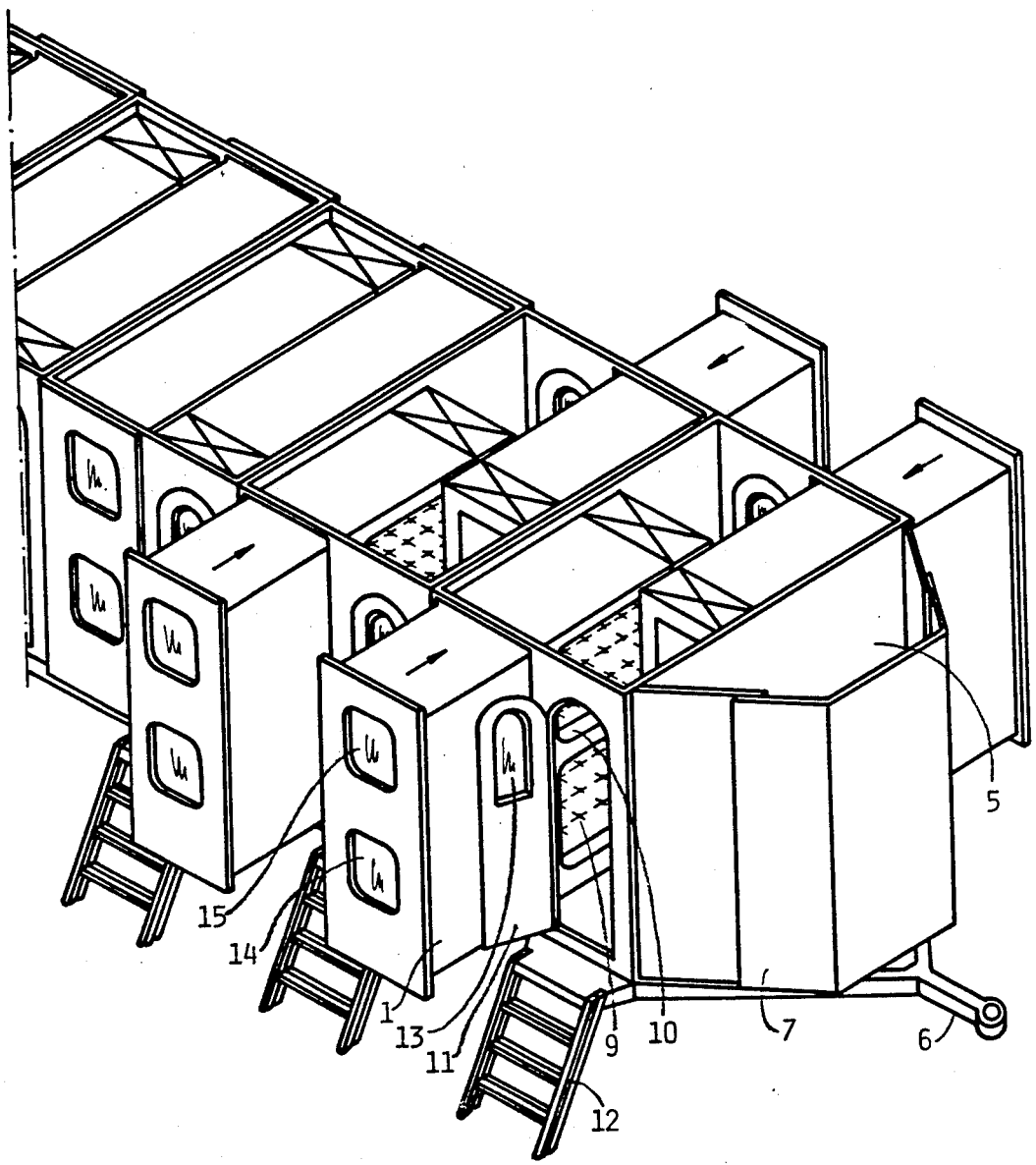
FIG. 2 is a perspective view of the embodiment shown in FIG. 1.

FIG. 2 shows the sleeping trailer according to FIG. 1 in a perspective view, with the roof being left off for reasons of clarity. The illustration shows how two beds 1a and 1b can easily be accommodated one on top of the other. Recesses 9 and 10 are worked as entrance openings into the pull-out sleeping elements 1 which have the width of beds and are configured as block-shaped hollow bodies. The entrance openings have a width which is adapted to the length of the region of the unit which, in the pulled-out state, remains within the basic outline of the trailer.

Between the pull-apart sleeping elements 1 of the cabins, doors 11 are provided which permit individual access to the interior of the cabin over stairs 12. Door 11 and element 1 are provided with windows 13 and 14, 15, respectively, so that the interior of the cabin receives a good amount of daylight.

What is claimed is:

1. Mobile lodging, including a vehicle body for a trailer and having a plurality of laterally adjacent sleeping cabins with dimensions that can be reduced for transport, the improvement wherein:

each of said sleeping cabins includes a fixed portion and a sleeping element extending in a longitudinal direction and containing at least one bed, said sleeping element being slidable in said longitudinal direction in said fixed portion between an open configuration in which said fixed portion contains an open aisle region located longitudinally behind said at least one bed and a closed configuration in which said sleeping element totally occupies the aisle region; each of said sleeping cabins having another one of said sleeping cabins immediately laterally adjacent thereto, the aisle region of each of said sleeping cabins in its open configuration being bounded on a side by the sleeping element of the immediately laterally adjacent sleeping cabin, providing direct lateral access to the aisle region from the sleeping element of said immediately laterally adjacent sleeping cabin.

2. Lodging according to claim 1, wherein when all said sleeping cabins are in said closed configuration said vehicle body has a reduced-size outline, and each said sleeping element can be slid by a distance in said longitudinal direction to form said open configuration said distance being less than the length of the sleeping element so that, within said reduced-sized outline, there still remains an access opening to such at least one bed.

3. Lodging according to claim 2, wherein, in said open configuration, each of said sleeping elements has an enclosed portion located outside of said reduced-size outline which is provided with a closable window opening.

4. Lodging according to claim 1, wherein the sleeping elements of adjacent sleeping cabins are slidable in mutually opposite directions to form said open and closed configurations, respectively.

5. Lodging according to claim 2, wherein the sleeping element of each said sleeping cabin includes a portion which is pullable to a position outside of said reduced-size outline to form the open configuration and said portion includes an end of the at least one bed and is provided with at least one window.

6. Lodging according to claim 1, wherein each said sleeping cabin includes a cabinet unit which is disposed at an end of the at least one bed of the sleeping element of said sleeping cabin.

7. Lodging according to claim 1, wherein each said sleeping cabin includes a separate door for providing access from outside said vehicle body to the aisle region of that sleeping cabin.

* * * * *